US006235859B1

(12) United States Patent
Naka et al.

(10) Patent No.: US 6,235,859 B1
(45) Date of Patent: May 22, 2001

(54) PRODUCTION PROCESS FOR POLYVINYL ETHER AND CATALYST USED FOR THE PROCESS

(75) Inventors: Akio Naka, Takatsuki; Yuuji Shimasaki, Otsu, both of (JP)

(73) Assignee: Nippon Shokubah Co Ltd, Osaka (JP)

( * ) Notice: Subject to any disclaimer, the term of this patent is extended or adjusted under 35 U.S.C. 154(b) by 0 days.

(21) Appl. No.: 09/323,156

(22) Filed: Jun. 1, 1999

(30) Foreign Application Priority Data

Jun. 1, 1998 (JP) .................................................. 10-151222

(51) Int. Cl.[7] ..................................................... G08F 16/12
(52) U.S. Cl. ........................ 526/332; 526/103; 526/209; 502/80; 502/81; 502/83
(58) Field of Search ..................................... 526/209, 103, 526/332; 502/80, 81, 83

(56) References Cited

U.S. PATENT DOCUMENTS 5,362,872   11/1994   Baumann et al. .
5,691,430 * 11/1997   Dougherty et al. .................. 526/103

FOREIGN PATENT DOCUMENTS

0375267 *  6/1990  (EP) .
0644175    3/1995  (EP) .
1272572    5/1972  (GB) .
2120571   12/1983  (GB) .

OTHER PUBLICATIONS

Hitoshi Yamaoka, et al., Kobunshi Kagaku, vol. 18, pp. 561–566 (1961), "The Studies on the Cationic Polymerization of Alkyl Vinyl Ethers by Heterogeneous Catalysts", (English Abstract, p. 566).
Database WPI, Section Ch, Week 8927, Derwent Publications Ltd., London, GB; Class A14, AN 89–195662 XP 002114631 & JP 01 132606 A (Tokuyama Soda KK), May 25, 1989.

* cited by examiner

Primary Examiner—David W. Wu
Assistant Examiner—Ling-Siu Choi

(57) ABSTRACT

Provided are an industrially advantageous process for producing a polymer of polyvinyl ether at a temperature of not lower than a room temperature for short time, and a catalyst used for the process. The above process is characterized by using an acid clay mineral subjected to acid treatment as a catalyst to polymerize vinyl ether.

11 Claims, No Drawings

PRODUCTION PROCESS FOR POLYVINYL ETHER AND CATALYST USED FOR THE PROCESS

FIELD OF THE INVENTION

The present invention relates to a production process for polyvinyl ether and a catalyst used for the same. Polyvinyl ether is a useful material which is widely used as a raw material for pressure sensitive adhesive agents, adhesives and paints.

RELATED ART

Polyvinyl ether is industrially produced by homogeneous cationic polymerization in which a Lewis acid catalyst such as boron trifluoride is used. However, there are the problems that a low temperature of 0° C. or lower which is industrially disadvantageous is required in order to obtain a high molecular polymer and that resulting polyvinyl ether is colored.

On the other hand, known as well is polymerization of polyvinyl ether in a heterogeneous system in which solid acids such as chromium (III) oxide and silica-alumina are used. In this case, however, there is the problem that the polymerization activity is low and if the polymerization goes on, resulting polyvinyl ether is colored or decomposed.

Further, it is known that when polyvinyl ether is polymerized using sulfate or acid clay as a catalyst, it is polymerized at a high temperature of not lower than a room temperature, but there has been the problem that the catalyst has a low polymerization activity and both the molecular weight and the polymerization rate are not raised so much (Kobunshi Kagaku, vol. 18, No. 197 (1961), p. 561 to 566). A solid acid catalyst can be used in a large amount in order to make up for the low polymerization activity, but there have been the problems that the high viscosity of the resulting polymer solution makes it difficult to remove the catalyst after the polymerization and that the quality of the product is reduced.

With respect to a method for solving the problems described above to obtain a polymer at a temperature of not lower than a room temperature, it is disclosed in U.S. Pat. No. 5,691,430 to use a catalyst (sea sand and kaolin) comprising silicon dioxide and at least one metal oxide selected from aluminum oxide, magnesium oxide, iron oxide and titanium oxide. However, the catalyst is subjected to no any treatment for raising an activity, and a natural mineral is used as it is. Accordingly, the activity as a polymerization catalyst is low, so that it takes as long time as 8 hours to one month to obtain the desired polymer.

[Problems to be Solved by the Invention]

An object of the present invention is to solve the problems described above, that is, to provide a process for producing polyvinyl ether at a temperature of not lower than a room temperature which is advantageous for industrial production for short time at a good productivity, and a catalyst used for the above process. [Means for Solving the Problems]

Investigations continued by the present inventors in order to achieve the above object have resulted in finding that a material obtained by subjecting an acid clay mineral to acid treatment to strengthen an activity reveals a surprisingly high activity as a polymerization catalyst for polyvinyl ether, and thus they have come to complete the present invention. The material obtained by subjecting an acid clay mineral to acid treatment includes, for example, a material called [Factivated clay]. The activated clay is obtained by subjecting an acid clay mineral to acid treatment to turn it to a porous structure material having a far larger specific surface area than that of the original acid clay mineral. Since this material has a high specific surface area and a porous structure, it has a very high adsorbing capacity of chemical matters and is used as an adsorbing agent for refining mineral oils and decoloring organic chemicals. However, there have so far been no examples in which it is tried to use this material as a catalyst for cationic polymerization.

Thus, according to the present invention, provided is a production process for polyvinyl ether by polymerizing vinyl ether in the presence of a catalyst, characterized by using an acid clay mineral subjected to acid treatment as the catalyst described above.

The vinyl ether described above is represented by the following Formula (1):

$$CH_2=CHOR \qquad (1)$$

wherein R represents an alkyl group allowed to have a substituent, a cycloalkyl group, an alkenyl group, an aryl group, an aralkyl group or a silyl group.

The catalyst described above is used usually in an amount falling in a range of 10 to 5000 ppm based on the weight of vinyl ether.

Further, according to the present invention, provided is a catalyst characterized by comprising an acid clay mineral subjected to acid treatment as a catalyst useful for polymerizing vinyl ether to produce polyvinyl ether.

[Embodiment of the Invention]

The catalyst according to the present invention is a catalyst comprising a material obtained by subjecting an acid clay mineral to acid treatment. The acid clay mineral specified in the present invention is a composite oxide containing $SiO_2$ and $Al_2O_3$ as principal components and $Fe_2O_3$, MgO and CaO as trace components. Suitable examples of such acid clay mineral include a group of clay minerals called acid clays such as kaolinite and montmorillonite.

The acid used for the acid treatment shall not specifically be restricted, and mineral acids such as sulfuric acid, hydrochloric acid and nitric acid are usually used.

It is known that the acid clay mineral described above is treated with an acid such as a mineral acid and the like to elute a part of $Al_2O_3$, $Fe_2O_3$, MgO and CaO, whereby a porous structure material having a far larger specific surface area than that of the original acid clay mineral is obtained. This material has a high specific surface area and a porous structure and therefore has a very high adsorbing capacity of chemical matters. In the present invention, it is considered that these high specific surface area and porous structure act effectively to reveal the high activity as an acid catalyst for polymerizing vinyl ether.

Publicly known methods can be used as a method for the acid treatment described above. Included are, for example, (i) a method in which the acid clay mineral is treated with 10 to 50% sulfuric acid at 80 to 90° C. for 1 to 5 hours and then sufficiently washed with water to remove water soluble components, followed by drying and (ii) a method in which the acid clay mineral is immersed in 50 to 80% sulfuric acid for several days to several weeks and then sufficiently washed with water to remove water soluble components, followed by drying. The method (i) is preferred since it is simple and efficient.

The catalyst prepared in the manner described above has a specific surface area of 150 to 300 $m^2/g$. The specific surface area is increased to a large extent while the acid clay mineral has a specific surface area of 50 to 100 $m^2/g$.

The material obtained by subjecting an acid clay mineral to acid treatment includes, for example, a material called activated clay. The activated clay is obtained by subjecting an acid clay mineral to acid treatment to turn it to a porous structure material having a far larger specific surface area than that of the original acid clay mineral.

The catalyst according to the present invention has a very high activity, and therefore even if the use amount of the catalyst is 100 ppm or less based on vinyl ether, the polymerization reaction goes on sufficiently well, but the catalyst amount may be increased if necessary. The use amount of the catalyst is usually 10 to 5000 ppm, preferably 50 to 1000 ppm based on the amount of vinyl ether. Too much catalyst amount causes discoloration of the yielded material or reduces the quality of the product.

Vinyl ether used as a raw material monomer in the present invention is, for example, the compound represented by Formula (1) described above. To be specific, suitable examples thereof include methyl vinyl ether, ethyl vinyl ether, isopropyl vinyl ether, n-propyl vinyl ether, isobutyl vinyl ether, n-butyl vinyl ether, t-butyl vinyl ether, n-octyl vinyl ether, cyclohexyl vinyl ether, phenyl vinyl ether, benzyl vinyl ether, 2-ethoxyethyl vinyl ether, phenoxyethyl vinyl ether, 2-chloroethyl vinyl ether, trimethylsilyl vinyl ether, triethylsilyl vinyl ether and triphenylsilyl vinyl ether. Further, two or more kinds of these monomers can be used to prepare a copolymer.

In polymerizing vinyl ether, the polymerization may be carried out in bulk, but a solvent may be used in order to control the reaction temperature and the viscosity. There can suitably be used as the solvent, non-polar solvents, for example, aromatic hydrocarbons such as toluene and xylene, aliphatic hydrocarbons such as hexane and octane, or halogenated hydrocarbons.

The polymerization reaction in the present invention can be carried out by any reaction system of a batch type, a semi-batch type and a continuous flow type. The batch type polymerization reaction can be carried out by stirring vinyl ether together with the catalyst or leaving it for standing in the presence or absence of the solvent described above in the air or inert gas. Further, the continuous flow type polymerization reaction can be carried out by continuously passing vinyl ether alone or together with the solvent through a reactor charged with the catalyst.

The smaller the moisture content in the reaction system, the more preferable for obtaining high molecular weight polyvinyl ether.

The reaction temperature is suitably a room temperature or higher, preferably 25 to 100° C. The reaction pressure may be either an atmospheric pressure or higher pressure than an atmospheric pressure and is usually an atmospheric pressure.

When the polymerization reaction is finished, an inorganic base such as NaOH and KOH, ammonia or an organic base such as amine can be added to the reaction mixture to terminate the reaction, but they do not necessarily have to be added.

EXAMPLES

The present invention shall more specifically be explained below with reference to examples, but the present invention shall by no means be restricted by them.

Catalyst preparing example
(Catalyst A)

Montmorillonite of 5 g was immersed in 30% sulfuric acid of 30 g and stirred at 90° C. for 5 hours. Then, precipitates were filtered off and washed in water of 100 g for 10 minutes while stirring. This washing operation was repeated five times, and then the precipitates on the funnel were washed three times with water of 100 g. The solid matter thus obtained was dried in the air at 120° C. for 20 hours and then pulverized into powder, whereby a catalyst A was prepared.

While montmorillonite had a specific surface area of about 80 $m^2/g$, the catalyst A had a specific surface area of about 300 $m^2/g$.

(Catalyst B)

A catalyst B was prepared in the same manner as in the catalyst A, except that the acid-treating time was changed to 3 hours.

While montmorillonite had a specific surface area of about 80 $m^2/g$, the catalyst B had a specific surface area of about 250 m /g.

(Catalyst C)

A catalyst C was prepared in the same manner as in the catalyst A, except that kaolinite of 5 g was used for the catalyst raw material.

While kaolinite had a specific surface area of about 60 $m^2/g$, the catalyst C had a specific surface area of about 280 $m^2/g$.

Example 1

The catalyst A of 0.1 mg and toluene of 4 g were put in a 10 ml sample tube, and ethyl vinyl ether of 1 g was added while stirring. Stirring was continued at a room temperature for one day, and the viscosity was increased. At this point of time, triethylamine of 3 $\mu l$ was added, and the solvent was distilled off, whereby a viscous colorless, transparent polymer was obtained. This polymer had a weight average molecular weight (calculated in terms of polystyrene) of 129,000 which was determined by GPC.

Example 2

The same experiment as in Example 1 was carried out to obtain a colorless, transparent polymer having a weight average molecular weight of 72,000, except that the amount of the catalyst A was changed to 1.0 mg.

Example 3

The same experiment as in Example 1 was carried out to obtain a colorless, transparent polymer having a weight average molecular weight of 154,000, except that n-propyl vinyl ether was substituted for ethyl vinyl ether, and triethylamine was not added after the polymerization.

Example 4

The same experiment as in Example 3 was carried out to obtain a colorless, transparent polymer having a weight average molecular weight of 115,000, except that n-butyl vinyl ether was substituted for n-propyl vinyl ether.

Example 5

The same experiment as in Example 1 was carried out to obtain a colorless, transparent polymer having a weight average molecular weight of 62,000, except that the catalyst B was substituted for the catalyst A.

Example 6

The same experiment as in Example 1 was carried out to obtain a colorless, transparent polymer having a weight average molecular weight of 108,000, except that the catalyst C was substituted for the catalyst A, and triethylamine was not added after the polymerization.

Example 7

The catalyst A of 0.3 mg and ethyl vinyl ether of 3 g were mixed and stirred under nitrogen atmosphere, and then vigorous polymerization reaction took place in about 5 minutes. The reaction solution was left as it was for one hour, whereby a viscous colorless, transparent polymer was obtained. This polymer had a weight average molecular weight of 58,000 which was determined by GPC.

Example 8

A four neck flask equipped with a stirrer, a thermometer, a cooling tube and a dropping funnel was charged with the catalyst A of 3.0 mg and toluene of 30 g under nitrogen atmosphere and heated to 45° C. Ethyl vinyl ether of 30 g was dropwise added thereto in one hour while maintaining the reaction temperature at 45° C. After heat stopped generating, the reaction was further continued at 60° C. for one hour, and then the reaction solution was cooled down to a room temperature. Triethylamine of 10 µl was added, and then the solvent was distilled off, whereby a viscous colorless, transparent polymer of 30.3 g was obtained. This polymer had a weight average molecular weight of 62,000 which was determined by GPO.

Example 9

A four neck flask equipped with a stirrer, a thermometer, a cooling tube and a dropping funnel was charged with the catalyst A of 1.5 mg and toluene of 30 g under nitrogen atmosphere. Ethyl vinyl ether of 30 g was dropwise added thereto at 60° C. in one hour. After heat generated by the reaction stopped, the reaction was further continued at 75° C. for 30 minutes, and then the reaction solution was cooled down to a room temperature. Triethylamine of 10 µl was added, and then the solvent was distilled off, whereby a viscous colorless, transparent polymer of 29.2 g was obtained. This polymer had a weight average molecular weight of 39,000 which was determined by GPC.

Example 10

A four neck flask equipped with a stirrer, a thermometer, a cooling tube and a dropping funnel was charged with the catalyst A of 6.0 mg and toluene of 20 g under nitrogen atmosphere and heated to 35° C. Ethyl vinyl ether of 60 g was dropwise added thereto in 2 hours while maintaining the reaction temperature at 35 to 40° C. After heat stopped generating, the reaction was further continued at 50° C. for one hour, and then the reaction solution was cooled down to a room temperature. Triethylamine of 10 µl was added, and then the solvent was distilled off, whereby a viscous colorless, transparent polymer of 59.8 g was obtained. This polymer had a weight average molecular weight of 52,000 which was determined by GPC.

Example 11

A four neck flask equipped with a stirrer, a thermometer, a cooling tube and a dropping funnel was charged with the catalyst A of 3.0 mg and hexane of 30 g under nitrogen atmosphere and heated to 45° C. Ethyl vinyl ether of 30 g was dropwise added thereto in one hour while maintaining the reaction temperature at 45° C. After heat stopped generating, the reaction was further continued at 60° C. for one hour, and then the reaction solution was cooled down to a room temperature. Triethylamine of 10 µl was added, and then the solvent was distilled off, whereby a viscous colorless, transparent polymer of 29.8 g was obtained. This polymer had a weight average molecular weight of 45,000 which was determined by GPC.

Example 12

A four neck flask equipped with a stirrer, a thermometer, a cooling tube and a dropping funnel was charged with the catalyst A of 3.0 mg and toluene of 30 g under nitrogen atmosphere and heated to 45° C. Ethyl vinyl ether of 30 g containing 0.7 wt % of water was dropwise added thereto in one hour while maintaining the reaction temperature at 45° C. After heat stopped generating, the reaction was further continued at 60° C. for one hour, and then the reaction solution was cooled down to a room temperature. Triethylamine of 10 µl was added, and then the solvent was distilled off, whereby a viscous colorless, transparent polymer of 28.9 g was obtained. This polymer had a weight average molecular weight of 27,000 which was determined by GPC.

Comparative Example 1

The same experiment as in Example 1 was carried out, except that kaolin was substituted for the catalyst A, but the viscosity was not raised even after stirring for one day, and the polymerization did not take place.

Comparative Example 2

The same experiment as in Example 2 was carried out, except that montmorillonite was substituted for the catalyst A, but the viscosity was not raised even after stirring for one day, and the polymerization did not take place.

Comparative Example 3

The same experiment as in Example 2 was carried out, except that silica•alumina was substituted for the catalyst A, but the viscosity was not raised even after stirring for one day, and the polymerization did not take place.

Comparative Example 4

The same experiment as in Example 7 was carried out, except that kaolin was substituted for the catalyst A, but the viscosity was not raised even after stirring for 8 hours, and the polymerization did not take place.

[Effects of the Invention]

The present invention makes it possible to obtain colorless, transparent polyvinyl ether at a temperature of not lower than a room temperature which is advantageous for industrial production for short time at a good productivity.

The present invention also makes it possible to obtain efficiently a high-molecular polyvinyl ether having a weight average molecular weight of 20,000 or more, particularly 25,000 to 1,000,000.

What is claimed is:

1. A process for producing polyvinyl ether which comprises polymerizing vinyl ether in the presence of an acid treated clay mineral catalyst.

2. The process of claim 1, wherein said vinyl ether is a compound represented by the following Formula (1):

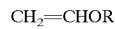  (1)

$CH_2=CHOR$ wherein R represents an alkyl group which can have a substituent, a cycloalkyl group, an alkenyl group, an aryl group, an aralkyl group or a silyl group.

3. The proces of claim 1 or 2, wherein said catalyst is in an amount of 10 to 5000 ppm based on the weight of the vinyl ether.

4. The process of claim 3 wherein the polyvinyl ether obtained has a weight average molecular weight of 25,000 to 1,000,000.

5. The process of claim 3 wherein the acid treated clay catalyst is obtained by the acid treatment at a temperature of 80 to 90° C.

6. The process of claim 3 wherein the polymerization is carried out at atmospheric pressure.

7. A process for producing polyvinyl ether which comprises contacting a vinyl ether of the Formula (1):

$$CH_2=CHOR \qquad (1)$$

wherein R represents a member selected from the group consisting of an alkyl group which can have a substituent, a cycloalkyl group, an alkenyl group, an aryl group, an aralkyl group and a silyl group, with an acid treated clay mineral catalyst having a specific surface area of 150 to 300 m$^2$/g, to obtain said polyvinyl ether.

8. The process of claim 7 wherein the catalyst is in an amount of 50 to 1000 ppm based on the weight of the vinyl ether and the polyvinyl ether obtained has a weight average molecular weight of 25,000 to 1,000,000.

9. The process of claim 7 or 8 or wherein the polymerization reaction is carried out at room temperature to 90° C. and at atmospheric pressure.

10. The process of claim 7 or 8 wherein the acid treated clay mineral is a member selected from the group consisting of montmorillonite and kaolinite.

11. The process of claim 7 or 8 wherein the polymerization reaction is carried out for a period of 5 minutes to 24 hours and the polyvinyl ether obtained has a weight average molecular weight of 27,000 to 154,000.

* * * * *